United States Patent [19]

Snyder et al.

[11] Patent Number: 5,085,808
[45] Date of Patent: Feb. 4, 1992

[54] PROCESS FOR EFFICIENTLY EXTRACTING HIGH QUALITY OIL FROM SOYBEANS AND OTHER OIL BEARING SEEDS

[75] Inventors: Harry E. Snyder, Springdale, Ark.; Kurt L. Wiese, Hilliard, Ohio; Gueyhwa Sheu, Fayetteville, Ark.; Helen G. Brown, Fayetteville, Ark.; Cinping Nieh, Fayetteville, Ark.; Patricia K. Clark, Fayetteville, Ark.

[73] Assignee: The Board of Trustees of the University of Arkansas, Little Rock, Ark.

[21] Appl. No.: 514,841

[22] Filed: Apr. 18, 1990

[51] Int. Cl.$^5$ ............................................... C11B 1/14
[52] U.S. Cl. ................................................. 260/412.4
[58] Field of Search ..................................... 260/412.4

[56] References Cited

U.S. PATENT DOCUMENTS 4,008,210  2/1977  Steele et al. ..................... 260/412.4

FOREIGN PATENT DOCUMENTS 555636  9/1943  United Kingdom ............ 260/412.4

OTHER PUBLICATIONS

Snyder et al., JAOCS, vol. 65, #2, 1988, pp. 555-557.
Snyder et al., Department of Food Science, University of Arkansas, Feb. 1988 issue of J.A.O.C.S., vol. 65, No. 2.

Primary Examiner—Jose G. Dees
Assistant Examiner—Deborah D. Carr
Attorney, Agent, or Firm—Hermann Ivester

[57] ABSTRACT

Soybeans and other oil bearing seeds are dried at temperatures below 130° to a moisture content of about 9-10% by weight, dehulled, and ground to a fine flour of less than about 150 um. The flour is subjected to a rapid solvent extraction procedure and separated into oil and oil freed components. Phospholipids are retained in the oil freed flour and lecithin is recovered from the flour by extraction. The process eliminates heretofore necessary degumming purification treatments to produce edible oil and leaves valuable constituents such as lecithin in the oil extracted flour for easy recovery or for retaining in the flour for other uses.

16 Claims, No Drawings

PROCESS FOR EFFICIENTLY EXTRACTING HIGH QUALITY OIL FROM SOYBEANS AND OTHER OIL BEARING SEEDS

BACKGROUND OF THE INVENTION

1. Field of the Invention

This invention relates to the art of extracting oil from oil-bearing seeds while retaining free fatty acids, pigments, and phospholipids in the oil freed seed material and specifically deals with high yield rapid low temperature solvent extraction of relatively pure oil from low temperature dried finely ground soybean flour having a low moisture content while retaining phospholipids in the seed material from which lecithin can be easily extracted.

2. Description of the Prior Art

Heretofore, oil-bearing seeds such as soybeans have been formed into flakes and oil has been removed from the flakes by solvent extraction. This procedure extracts undesired free fatty acids, pigments, and phospholipids with the oil. The extracted oil therefore has to be refined and degummed to be edible and substantial amounts of oil are lost during the refining process.

It has now been found that drying of the seeds only to moisture contents around 9–10% under relatively low temperature conditions below 130° C., preferably around 70° C., grinding the dried seeds to a fine flour which loses moisture to the atmosphere to provide a flour of 6% or less moisture content followed by a low temperature rapid solvent extraction of the flour produces a purer oil and a phospholipid rich residual seed flour from which valuable lecithin can be easily recovered.

It would therefore be an improvement in this art to enhance the yield and purity of oil extracted from oil-bearing seeds such as soybeans.

It would be a further improvement in this art to retain phospholipids in the seed material during solvent extraction of oil from the seeds and to alternatively leave valuable lecithin in the seed material as a feed stock or to easily solvent extract the lecithin from the seed material.

SUMMARY OF THE INVENTION

According to this invention, soybeans, and other oil-bearing seeds having not more than about 30% oil such as cotton seed and the like are dried at mild temperature below 130° C. and preferably around 70° C. to a moisture content around 9–10% by weight. The dried seeds are dehulled and ground into a fine flour of less than about 100 mesh or 150 um (micrometers). The ground flour loses moisture to the atmosphere to a moisture content of about 6% by weight or less. The 6% or less moisture content ground flour is rapidly solvent extracted at low temperatures below about 55° C. with a suitable organic solvent such as hexane, petroleum ether, ligroine and the like. The drying of the seeds at relatively low temperature to moisture contents within the range of 9–10% by weight and the grinding of the dried seeds to a very fine micro particle size provides a flour which releases oil from the seed extremely rapidly. The fine flour releases substantially all of its oil content in a rapid solvent extraction method. A slurry of the flour and the organic solvent kept below about 55° C. is agitated for only about one minute and more oil is released in this short time than can be extracted from a coarser material such as flakes in a much longer time.

The increased solvent extraction time heretofore necessary increases the extraction of undesirable impurities with the oil producing a product that has to be refined and degummed before it is edible.

For example, it has been found that more oil is released from the finely ground flour during a 30–40 second agitation of the flour with the solvent, than is released in about five minutes of agitation of seed flakes and the same solvent.

A relatively pure oil extracted from the flour in the rapid solvent extraction procedure need only be lightly refined to produce an edible oil with considerable less oil loss than heretofore experienced.

The unexpected retention of materials that are not desired in edible oil by the extracted seed flour provides a valuable lecithin source in the flour which can be easily and inexpensively extracted or left in the flour to provide an enhanced feed stock.

It would therefore be an object of this invention to increase the yield and purity of oil extracted from oil-bearing seeds such as soybeans.

Another object of this invention is to decrease the solvent extraction time for obtaining oil from oil-bearing seeds.

A still further object of the invention is to pre-heat treat oil-bearing seeds at low temperature to reduce their moisture contents within a range around 10% by weight before solvent extracting oil from a fine flour ground from the dried seeds.

A still further object of the invention is to reduce the cost of producing edible oils from oil-bearing seeds.

Other and further objects of this invention will become apparent to those skilled in this art from the following detailed descriptions of preferred embodiments of the invention.

BRIEF DESCRIPTION OF THE PREFERRED EMBODIMENTS

Soybeans of the "Forrest" cultivar grown under irrigation were prepared for extraction by heating in an 80° C. oven for one hour. When cooled, the soybeans were dehulled in a blender and the hulls removed by aspiration. The dehulled seeds were then ground to a fine flour in a cyclone sample mill without a screen. The ground flour was sieved with an Alpine Air-Jet Sieve fitted with a 100 mesh sieve. About 60–70% of the thus ground flour passed the 100 mesh screen. Evaporation of moisture from the flour to the atmosphere at normal room temperatures and humidity conditions brought the moisture content of the flour below 6% by weight. Samples of the flour passing the 100 mesh screen were solvent extracted at low temperatures below about 55° C. in rapid equilibrium extraction procedures wherein one to two gram samples of the flour were agitated for one minute in glass stoppered erlenmeyer flasks containing 20 ml of HPLC grade hexane.

The flour-hexane slurry was stirred throughout the extraction and then the flour was allowed to settle for 5 minutes. The micella was poured into a 20 ml syringe and pushed through a 0.8 um membrane filter into another erlenmeyer flask which was immediately stoppered. Aliquots of 5 ml were pipetted from this micella into tared aluminum pans. Hexane was evaporated from the micella in an 80° C. oven for 20 minutes and the weight increase in the aluminum pan was used to calculate the percent of oil that was extracted.

The oil extracted only contained about 30-50 ppm phospholipid phosphorous as compared with values of about 300 ppm phospholipid phosphorous normally extracted from soybean flakes.

The free fatty acid content of the extracted oil was only about 0.07% as compared with 0.3 to 0.7% for oil extracted from beans that had been flaked.

The lecithin content of the oil freed flour was extracted with 65% aqueous ethanol in a solvent extraction procedure by forming a slurry of the defatted flour in hexane and aqueous ethanol at a rate of about 1 to 2 grams of flour to about 20 ml of aqueous ethanol, agitating the same for several minutes and recovering the lecithin from the aqueous ethanol by evaporation.

From these descriptions, it should be understood to those skilled in this ar that the quality of oil extracted from finely ground oil-bearing seeds is increased by a mild temperature drying of the seeds substantially below 130° C. and preferably around 70° C. to a moisture content of from 9-10% by weight. Under normal room conditions, the moisture content of the finely ground flour is reduced to 6% or less, and then the flour is rapidly solvent extracted at temperatures below about 55° C. The high quality oil need only be lightly refined to provide an edible oil since undesired fatty acid impurities are retained in the extracted flour and the high phospholipid content of the flour is easily extracted to provide lecithin.

We claim as our invention:

1. A method of enhancing the quality of oil extracted from oil bearing seeds which can be formed into a fine flour which comprises drying the seeds at temperatures below 130° C. to moisture contents of about 9-10% by weight, dehulling the dried seeds, reducing the dehulled dried seeds to a flour having a particle size less than about 150 micrometers and rapidly solvent extracting oil from the flour at low temperatures while retaining phospholipids in the flour.

2. The method of claim 1, wherein the rapid solvent extracting of oil from the flour is carried out at temperatures below 55° C.

3. The method of claim 1, wherein the flour is reduced to a moisture content below 6% before solvent extracting.

4. The method of claim 1, wherein the solvent is hexane.

5. The method of claim 1, wherein the temperatures below 130° C. are about 70° C.

6. The method of claim 1, wherein the flour is exposed to the atmosphere before solvent extracting to reduce its moisture content to below 6% by weight.

7. The method of claim 1, wherein the dehulling of the seeds is accomplished by aspiration.

8. The method of claim 1, including the added step of recovering lecithin from the flour after solvent extracting oil from the flour.

9. The method of claim 1, wherein the solvent extracting of oil from the flour at low temperatures is carried out with a solvent selected from the group consisting of hexane, petroleum ether, and ligroine.

10. The method of extracting relatively pure oil from soybeans which comprises drying the soybeans at temperatures less than 130° C. to a moisture content about 9-10% by weight, dehulling the dried seeds, reducing the dehulled dried seeds to a flour having a particle size less than about 150 micrometers, evaporating moisture from the flour to lower the moisture content to about 6% by weight, rapidly solvent extracting oil from the flour having about 6% moisture at low temperatures below about 55° C. for less than about 1 minute while retaining phospholipids in said flour, and recovering the oil and said flour for use.

11. The method of claim 10, wherein the drying temperature is about 70° C.

12. The method of claim 10, wherein the solvent is hexane and the extraction time is less than one minute.

13. The method of recovering lecithin from soybeans and the like oil-bearing seeds which comprises drying the seeds at temperatures of around 70° C. to a moisture content of about 10% by weight, dehulling the dried seeds, grinding the dehulled, dried seeds to a fine flour passing a 100 mesh screen, forming a slurry of the flour and an organic solvent for the oil content of the flour, agitating the slurry for about one minute, removing the micella from the slurry, separating the oil from the micella, recovering the oil freed flour still in the extracting solvent, and extracting lecithin from the oil freed flour.

14. The method of claim 13, including the added step of extracting lecithin from the oil freed flour with aqueous ethanol.

15. The method of claim 13, wherein the drying is effected at temperatures of about 70° C. for about one hour.

16. The method of claim 1, wherein the extracting of lecithin from the oil freed flour is effected with an aqueous ethanol solvent.

* * * * *